Patented Sept. 26, 1944

2,358,776

UNITED STATES PATENT OFFICE 2,358,776

WATERPROOFING OF CONCRETE

Herbert Goldstein, Elizabeth, N. J., and Leo Liberthson, New York, N. Y., assignors to L. Sonneborn Sons, Inc., a corporation of Delaware No Drawing. Application July 19, 1941, Serial No. 403,154

2 Claims. (Cl. 106—314)

This invention relates to new and useful improvements in the waterproofing of concrete.

Concrete and similar hydraulic mixes as a rule exhibit a comparatively high degree of absorption capacity for aqueous media. This is for many purposes an undesirable quality and attempts have been made in the past to waterproofing concrete and like hydraulic compositions. Among the most effective waterproofing agents are the water repellent metallic soaps, notably aluminum and calcium stearate. Though these have been added in the past to concrete and like hydraulic mixes, the results were very unsatisfactory. It is practically impossible to incorporate these water repellent metallic soaps as such into a concrete mix, as their water repellent nature prevents proper mixture or dispersion through the gauging water. Even when producing, for instance, a stearate, such as calcium stearate in situ, i. e., by neutralizing a hot lime slurry with stearic acid, thereby obtaining an aqueous calcium stearate slurry, not even the addition of the stearate in this aqueous slurry form will give a waterproofed concrete. Concrete samples prepared with such stearate slurry still exhibit a relatively high positive capillarity with respect to aqueous media and in fact their absorption capacity in some instances is even higher than a concrete made without water repellent additive.

We have discovered a new waterproofing composition capable of imparting to concrete and like hydraulic mixes a high degree of negative capillarity or water repellence. In accordance with the invention, a surface tension depressant in potency and amount sufficient to depress the surface tension of aqueous media to a point of positive capillarity with respect to a water repellent metallic soap is compounded in aqueous solution with a water insoluble metallic soap of ordinarily negative capillarity with respect to aqueous media. A solid and liquid substance are considered, as is well known in the art, as being of positive capillarity with respect to each other if the liquid is capable of wetting the solid and they are considered as being of negative capillarity if the liquid is not so capable to wet the solid.

The surface tension depressant in accordance with the invention must be one reactable with the lime in the concrete or other like hydraulic mix to yield substantially water insoluble products. This characteristic of the depressant is important to remove the same as a continuously active surface tension depressant from the mix.

Without such characteristic the surface tension depressant remaining in the concrete or other hydraulic mix in substantially unchanged condition would actually tend to increase a water absorption by the concrete. Among the surface tension depressants that we have found useful in accordance with the invention, are particularly the sulphonated fatty acid esters and excellent results have been obtained with sulphonated butyl oleate. The substantially water repellent metallic soaps in accordance with the invention may for instance comprise any of the water insoluble stearates and preferably calcium or aluminum stearate.

The composition in accordance with the invention is preferably compounded by adding the surface tension depressant to water or other aqueous medium and stirring the water repellent soap into the solution. The amounts are preferably so selected that the resulting waterproofing composition substantially contains .1 to .5 and preferably .2% of surface tension depressant of the afore-described character and nature, such as sulphonated butyl oleate, 10 to 40 and preferably 15 to 20% water repellent metallic soap such as aluminum or calcium stearate and 60 to 90%, and preferably 85% of water.

The waterproofing composition in accordance with the invention is then added to the concrete or other hydraulic mix. The amount of addition of the waterproofing composition is not critical and depends primarily upon considerations of degree of waterproofing desired to be obtained, range of compressive strength required of a particular mortar or concrete and relative proportions of cement, sand and aggregate commonly used in concrete construction. In general, amounts of addition of the waterproofing composition in accordance with the invention are left to the discretion of the operator to be adapted to the particular practice or objective at hand.

The foregoing description is by way of illustration and not of limitation and we are not to be limited to any details but only by the appended claims in which we have endeavored to claim broadly all inherent novelty.

We claim:

1. A waterproofing composition for concrete and like hydraulic mixes comprising 10 to 40% of a suspension of a finely divided water insoluble metallic stearate, being a member selected from the group consisting of calcium stearate and aluminum stearate, in 60 to 90% of aqueous medium, having normally a negative capillarity with respect to said stearate, and, substantially dissolved in said aqueous medium, .1 to .5% of sulfonated butyl oleate of a potency sufficient to depress the surface tension of said aqueous medium to a point of positive capillarity with respect to said stearate.

2. Method of waterproofing concrete which comprises finely dispersing in an aqueous solution of .1 to .5 part of sulfonated butyl oleate in 60 to 90 parts water, substantially 10 to 40 parts of a substantially water insoluble metallic stearate, being a member selected from the group consisting of calcium stearate and aluminum stearate having normally a negative capillarity with respect to water, said fatty acid ester in the amount present in said solution having a potency sufficient to depress the surface tension of water to a point of positive capillarity with respect to said stearate, thereafter finely dispersing the thereby obtained dispersion of said stearate in said aqueous sulfonated butyl oleate solution and incorporating the resulting composition into a concrete mix, using the water present in said solution as part of the gauging water required for said mix.

HERBERT GOLDSTEIN.
LEO LIBERTHSON.